United States Patent [19]

Gaines

[11] Patent Number: 4,564,170

[45] Date of Patent: Jan. 14, 1986

[54] VALVE CLOSURE MEANS

[76] Inventor: William P. Gaines, 1953 Riviera Dr., Vista, Calif. 92083

[21] Appl. No.: 583,822

[22] Filed: Feb. 27, 1984

[51] Int. Cl.⁴ .......................... F16K 1/46; F16K 1/48
[52] U.S. Cl. ...................................... 251/88; 251/357
[58] Field of Search ........................... 251/357, 88, 84

[56] References Cited

U.S. PATENT DOCUMENTS

| | | | |
|---|---|---|---|
| 933,779 | 9/1909 | Newell | 251/357 X |
| 1,482,021 | 1/1924 | Little | 251/357 X |
| 1,953,675 | 4/1934 | Erisman | 251/357 X |
| 2,057,233 | 10/1936 | Esnard | 251/88 |
| 2,132,894 | 10/1938 | Esnard | 251/357 X |
| 2,315,948 | 4/1943 | Esnard | 251/357 |
| 3,275,287 | 9/1966 | Bartlett | 251/88 |
| 3,892,383 | 7/1975 | Hesse | 251/357 X |

Primary Examiner—Arnold Rosenthal
Attorney, Agent, or Firm—John J. Murphey

[57] ABSTRACT

A closure means, for a valve, comprising communicating inlet and outlet ports and a closeable valve seat therebetween, comprising an elongated headless valve stem extending from the valve face through the seat into the inlet port and a resilient washer retained on the stem having an outer diameter larger than the valve seat and an inner hole larger than the stem to allow the washer to ride loose on the stem when the valve is open and close tight on the seat when the valve is closed.

1 Claim, 5 Drawing Figures

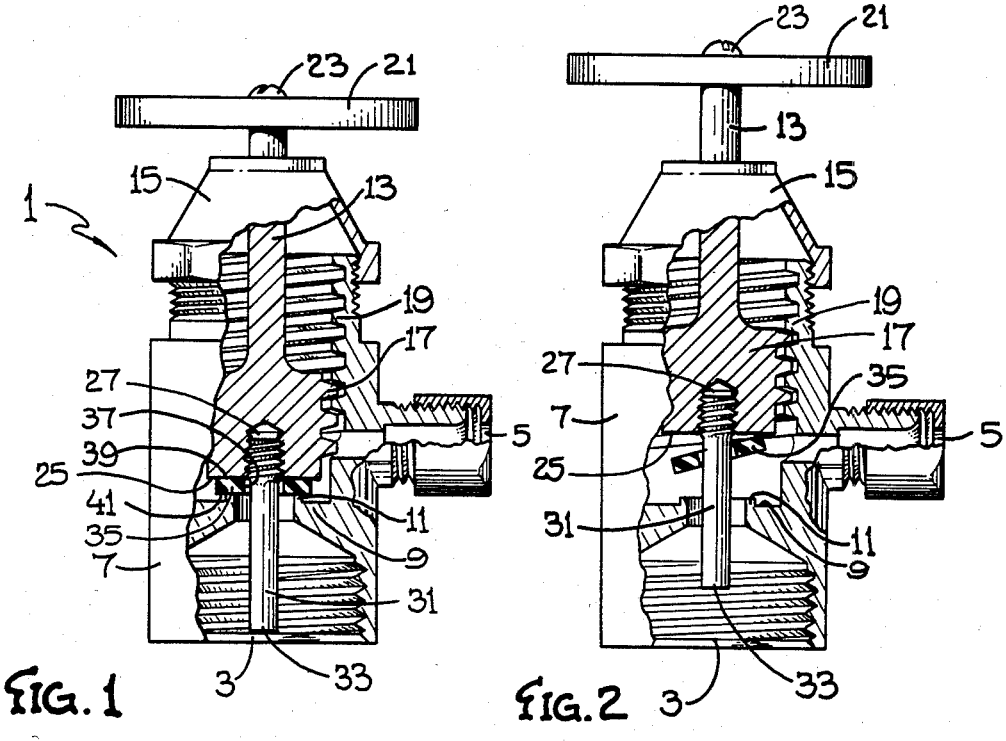
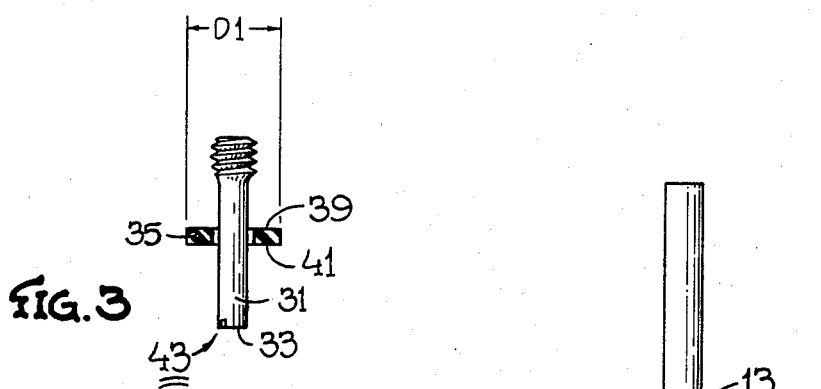
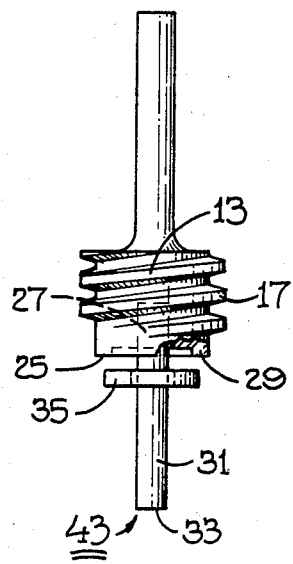

VALVE CLOSURE MEANS

FIELD OF THE INVENTION

This invention pertains to the field of valves. More particularly, this invention pertains to valves for control of liquid transfer over a wide range of viscosity such as oil and including water and the like where these valves generally comprise communicating inlet and outlet ports with a closeable valve seat therebetween.

DESCRIPTION OF THE PRIOR ART

Valves of the type described have a resilient washer on the face of the valve body that rides toward and away from the seat in response to the twist of the valve handle. Almost all of these washers are held fast to the face, usually in a pocket molded therein, by a machine screw that passes through a hole in the middle of the washer and into a threaded opening in the body. This means that the washer engages the valve seat in the same position each time the valve is closed.

Particulate matter in the liquid stream as well as pices of the pocket edge that flake off during use tend to gather in crevises and other places where liquid flow is interrupted. Accordingly, these particles work their way behind the washer causing it to ride unevenly on the valve face. This unevenness causes valve leakage and is usually corrected by twisting the washer more tightly against the seat. The differential wear caused to the washer face by the unevenness of the washer itself causes small eddys in the liquid flow that attract other particles and cause even more wear. Since the contact area of the valve washer on the valve seat is small, large pressures are exerted on the washer by virtue of the handle being turned, thus any small imperfection in the washer face is greatly magnified with the result that the washer is constantly squeezed tighter and tighter resulting in a very short life.

One attempt at solving this problem is shown in U.S. Pat. No. 2,132,894 to M. Esnard, where the washer inner hole was enlarged, the surface of the washer touching the valve body hardened and the valve stem slightly elongated to allow the washer to ride loose on the stem in the open valve position. While this reduces wear on the washer, the valve becomes very non-linear because of the bulbous stem head passing through the valve seat. In addition, hardening the face of the washer increases the cost thereof. Finally, the bulbous screwhead in the seat area in conjunction with the loose washer creates unwanted vibration and noise in the valve and adjacent pipes.

This invention is a new valve closure means that solves all of the aforementioned problems of the prior art plus giving the washer a significantly longer working life. This is accomplished by removing the bulbous head of the valve stem and projecting the stem through the seat well into the inlet port. The washer is made larger than the seat and its central hole is larger than the stem diameter. This configuration eliminates the non-linearity created in Esnard and eliminates all vibration and noise associated with operation of the valve. In addition, the washer can rotate and move away from the valve face to permit continuous cleaning of all surfaces in the liquid stream and repositioning of the washer on the seat at each closure. It is believed that the projection of the stem well into the inlet port smooths out the flow in the area of the seat however, this has not been actually proven. What has been shown by tests is that this valve configuration operates quietly at all settings and over a large range of water inlet pressure. The life of the washer is not only extended over other configurations but one size washer can be used in a wider range of valve sizes than heretofore. This invention is operable with a wide range of washers of not only various sizes but various shapes as well, such as flat, beveled, shouldered, or a combination thereof. Finally, the extended stem fits a wider range of valve sizes than existing stems and may be retrofitted on existing valves without the need for machining or other complicated operations.

Accordingly, the main object of this invention is a new valve closure means that eliminates vibration and noise in the valve over the total range of operation thereof. Another object is a retrofittable valve stem in combination with a loose valve washer to provide a self-cleaning and constantly repositioning function to the valve washer to provide for a longer wearing, smoother operating valve. A still further object of this invention is a valve of the type described operating in a more linear manner than valves heretofore in the prior art.

These and other objects will become more apparent upon reading the Description of the Preferred Embodiment along with the drawings appended hereto. The scope of protection sought by the inventor may be observed by reading the claims that conclude this specification.

DESCRIPTION OF THE DRAWINGS

FIG. 1 is a side view, partially cut away, showing the preferred embodiment of this invention mounted inside a typical water valve shown in its closed position.

FIG. 2 is a side view, partially cut away, showing the same embodiment in the same valve as in FIG. 1 but in the open position.

FIG. 3 is a side view of the combination valve stem and washer of this invention in their operative configuration.

FIG. 4 is a bottom end view of the same configuration as shown in FIG. 3.

FIG. 5 is a side view of a standard valve stem showing this invention operably mounted therewith.

DESCRIPTION OF THE PREFERRED EMBODIMENT

FIG. 1 shows a typical valve 1, to which this invention pertains, and comprises generally a threaded inlet tube or port 3 and a threaded outlet tube or port 5 in communication inside a valve shell 7 and separated by an annular valve seat 9 having an upwardly projecting annular lip 11. A valve body 13 is centrally suspended inside shell 7, above lip 11 and inside a valve bonnet 15, and has a threaded portion 17 that engages a series of threads 19 inside shell 7 and is adapted to ride up and down. i.e., move away from and toward seat 9 and lip 11 in response to the twisting of an exterior handle 21 that is attached to the exposed top of body 13 by screw 23. The portion of valve body 13 facing seat 9 comprises a flat face 25 having a threaded hole 27 centrally located thereon for receipt therein of a threaded machine screw (not shown) to hold a resilient washer (not shown) thereto. In some valves, said washer is surrounded by a raised rim 29 formed on face 25 (see FIG. 5).

The closure means of this invention comprises an elongated headless valve stem 31, adapted for threaded receipt in hole 27, and of a length sufficient to extend down through seat 9 and into inlet port 3, even when valve body 13 is opened to its furthest extent, terminating at an end 33.

In combination therewith, a thin resilient washer 35 is provided having an outer measurement or diameter D1 greater than the diameter of lip 11 and a central opening 37 therethrough of a size D2 greater than the diameter of stem 31 to permit said washer to ride loosely thereon. Resilient washer 35 has an upper surface 39 for contact with valve body face 25 and a lower surface 41 for contact with seat lip 11. The shape of upper and lower washer surfaces 39 and 41 respectively may vary without exceeding the concept of this invention and may include bevels and shoulders and the like. It is, however, preferred that both surfaces be flat and mutually parallel for best results. In addition, this invention will operate with or without the presence of rim 29 on valve body face 25 (see FIG. 5) however, it is preferred that rim 29 be removed, such as by simple filing or sanding to a bare flat face (see FIGS. 1 and 2).

In operation, washer 35 rides loose on stem 31 when the valve is opened (see FIG. 2) and will be squeezed against seat lip 11 by valve body face 25, in sealing relationship thereto, when the valve is closed by twisting handle 21. When the valve is open, washer 35 will be constantly washed on all sides by the liquid stream passing therethrough; washer 35 will seat against lip 11 in a different position each time the valve is closed thus reducing wear on any one particular area. Because stem 31 always extends through valve seat 9, no matter whether opened or closed, washer 35 will not float or be washed away from valve seat 9.

Means 43 may be included on terminal end 33 of valve stem 31 to aid in tightening stem 31 into threaded hole 27 in valve body 13. Means 43 can be one of a host of tightenable configurations such as circumferentially arranged flat faces to accept a wrench or a cross-slot to accept the end of a phillips screwdriver. As shown in FIG. 4, means 43 is a slot 45 formed in stem end 33 to accept the end of a conventional screwdriver.

What is claimed is:

1. In a valve comprising communicating inlet and outlet ports, an annular valve seat therebetween and a valve body including a valve face adapted for reciprocating movement against said seat, closure means comprising an elongated headless valve stem, fixedly anchored for nonrotary motion in said valve body and of a constant diameter throughout and having a portion thereof extending from said valve face and directed through said seat and terminating between said seat and said inlet port when said valve is fully opened and a resilient washer annularly received on said stem, between said face and said seat, having a central opening larger than said stem to permit free turning thereon and free movement along the length thereof when the valve is opened, and having an outside diameter larger than said seat to permit full closure between said face and said seat when the valve is closed including means on the ends of said valve stem for attaching it to said valve face wherein said means include threads on one end of said stem for receipt in a threaded hole formed in said valve face and a slot formed in the other end thereof for receipt therein of a screwdriver blade.

* * * * *